(No Model.)

G. G. KAISER.
WAGON WEIGHING ATTACHMENT.

No. 595,715. Patented Dec. 21, 1897.

Witnesses:
L. C. Hills.
A. L. Hough

Inventor:
Geo. G. Kaiser,
by Franklin H. Hough
Atty.

THE NORRIS PETERS CO., PHOTO-LITHO., WASHINGTON, D. C.

UNITED STATES PATENT OFFICE.

GEORGE G. KAISER, OF JOHNSON, WASHINGTON.

WAGON WEIGHING ATTACHMENT.

SPECIFICATION forming part of Letters Patent No. 595,715, dated December 21, 1897.

Application filed May 28, 1897. Serial No. 638,596. (No model.)

*To all whom it may concern:*

Be it known that I, GEORGE G. KAISER, a citizen of the United States, residing at Johnson, in the county of Whitman and State of Washington, have invented certain new and useful Improvements in Wagon Weighing Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in weighing-scales, and especially to an attachment for wagons, whereby the weight of the contents of the box thereof may be readily determined while supported on the bolster of the wagon by mechanism which may be adjusted to indicate the weight of the load or thrown out of adjustment, so as not to indicate the weight, while the wagon is being hauled from place to place.

More specifically the invention resides in the provision of a weighing attachment for wagons consisting of an arrangement whereby the weight of the wagon-box will normally rest on springs on the bolster-blocks, but when adapted for use for weighing a peculiar arrangement of winding-drums and ropes, together with an indicating-dial and mechanism connected therewith, are provided, whereby by first turning the operating-shaft having connection through its rope with the dial-indicator and the supports for the wagon-box the weight of the contents may be accurately determined.

To these ends and to such others as the invention may pertain the same consists in the novel construction, combination, and adaptation of the parts, as will be hereinafter more fully described and then specifically defined in the appended claim.

I clearly illustrate my invention in the accompanying drawings, which, with the letters of reference marked thereon, form a part of this specification, and in which drawings similar letters of reference indicate like parts throughout the several views, in which—

Figure 1:
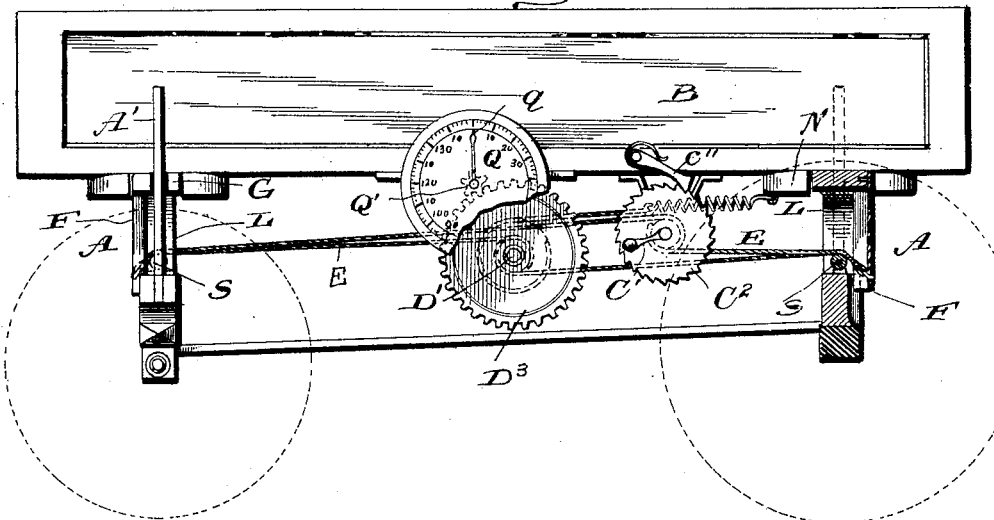
Figure 2:
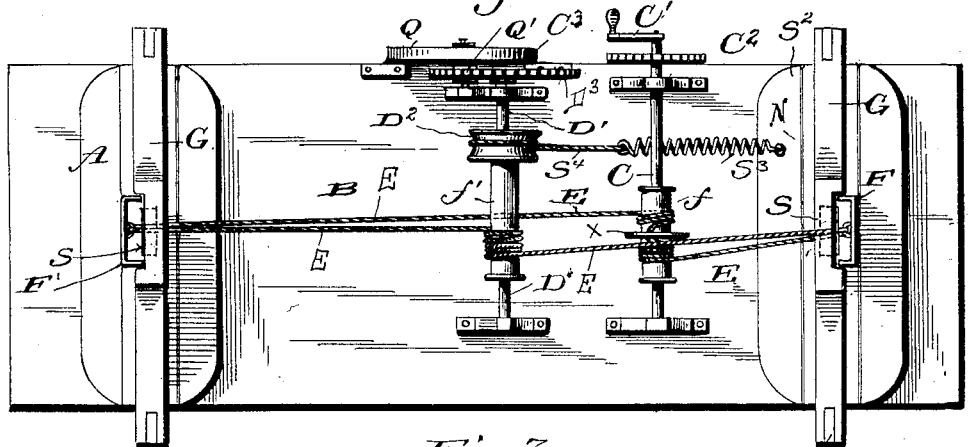
Figure 3:
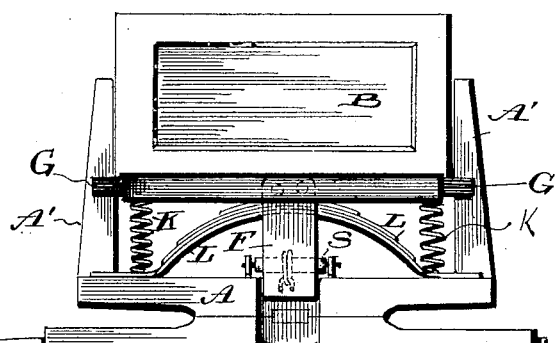

Figure 1 is a side elevation of a wagon equipped with my improved weighing attachment, parts of the wagon running-gear being shown in section to better illustrate the invention. Fig. 2 is a bottom plan view of the weighing attachment as applied to a wagon. Fig. 3 is an end elevation of the front of the wagon, showing the box mounted on springs on the bolster.

Reference now being had to the details of the drawings by letter, A designates the bolsters, on which the wagon-box B is mounted, being supported a slight distance above the bolsters on the strips G, underneath which are suitable springs L and K. Both ends of the wagon are similarly supported. These strips G are slotted at their ends and have a vertical play, guided in their movements by the strip A'.

S and S are friction-rollers which are journaled within bearings upon the bolsters at the front and rear ends of the wagon, respectively, over which rollers the rope E passes.

Journaled in suitable bracket-arms underneath the wagon-box is a winding-shaft C, having a winding-drum $f$ thereon. Journaled a slight distance from the said shaft C is a second shaft D', having a winding-drum $f'$ thereon and a pulley $D^2$. Secured near one end of the box is a cleat $S^2$, to which one end of the spring $S^3$ is secured. The other end of the said spring is connected to a rope $S^4$, which is secured to the pulley $D^2$. At the outer end of the shaft D' is keyed the geared wheel $D^3$, which is adapted to mesh with the cog-wheel Q', secured on a stub-shaft journaled to the under side of the wagon-box, said stub-shaft carrying an indicating-pointer $q$, which indicates the weight of the load on the dial Q, secured at the side of the wagon-box.

Keyed to the shaft C is a ratchet-wheel $C^2$, and pivoted to the side of the box is a pawl C'', which is designed to engage in the teeth of the said ratchet-wheel, and a suitable winding-handle C' is keyed to the outer end of the said shaft C, whereby as the said shaft is rotated the rope E, which has an end secured to and wound about the drum $f$ on shaft C, passes to the rear bolster of the wagon, where it rides on an antifriction-roller S, and then passes through an eye and back over said roller and is wound about the drum $f'$ on shaft D', thence passes to the forward bolster and over an antifriction-roller thereon, thence through an eye and back over the roller on the forward bolster, and is then passed to and wound about the drum $f$, the two ends of the said rope being secured to the same drum, but separated by the disk X, as will be readily understood.

When the rope E is slack, the weighing mechanism is out of gear and the weight of the box will rest on the bolster-springs. When it is desired to adapt the mechanism for weighing, the operator turns the shaft C by means of the crank-handle C′, secured thereto, makes a sufficient revolution to bring the indicating-pointer of the register at zero, and when thus adjusted the pawl is adapted to engage in the teeth of the wheel $C^2$ and hold the mechanism in its adjusted position. The turning of the said shaft D′ is caused by the winding up of the rope E on the shaft C, and on winding the rope on the shaft D′ the indicating-pointer will be actuated through the geared connections therewith, as will be readily understood. As the rope is made taut by rotating the shaft C the wagon-box is in readiness to receive the load to be weighed, and the pointer Q, indicating at zero, will indicate on the dial the weight of the load. It will be noted that as the indicating-pointer-carrying shaft is rotated, as in the registering of the weight of the load, the rope $S^4$, which is connected at one end to the spring $S^3$, with its other end secured to the pulley $D^2$, will wind up on the said pulley, causing a tension on the said spring. When the load is removed, it is the office of the said spring to cause the slacking of the said ropes and to return the indicating-pointer to zero, the slacking of the ropes being caused by the unwinding of the same on the drums.

Having thus described my invention, what I claim to be new, and desire to secure by Letters Patent, is—

A weighing attachment for wagons, comprising in combination with the bolsters and bolster-blocks mounted on springs, the pulley-carrying members secured to the said blocks, antifriction-rollers journaled on the bolsters, the shaft C, the winding-drum thereon, the ratchet-wheel keyed to the said shaft, the winding-crank and pawl, the shaft D′ carrying the drum $f'$, the geared wheel $D^3$, dial and indicating-pointer, the stub-shaft carrying said pointer and geared wheel Q′, the spring $S^3$ having one end secured to the wagon-box, the pulley $D^2$, the rope $S^4$ having one of its ends secured to said spring and the other end fastened to the said pulley $D^2$, and the rope E, having its ends secured to the drum $f$ on opposite sides of a disk, and wound about the drums $f$ and $f'$ and over the antifriction-rollers and through the eyes, as shown and described.

In testimony whereof I affix my signature in presence of two witnesses.

GEORGE G. KAISER.

Witnesses:
GEORGE P. LIBBY,
J. B. ELLSWORTH.